United States Patent
Kleinschnitz et al.

(10) Patent No.: US 8,225,193 B1
(45) Date of Patent: Jul. 17, 2012

(54) METHODS AND SYSTEMS FOR PROVIDING WORKSPACE NAVIGATION WITH A TAG CLOUD

(75) Inventors: Donald Kleinschnitz, Sandy, UT (US); Daniel Hardman, American Fork, UT (US); James Kleinschnitz, Salt Lake City, UT (US)

(73) Assignee: Symantec Corporation, Mountain View, CA (US)

( * ) Notice: Subject to any disclaimer, the term of this patent is extended or adjusted under 35 U.S.C. 154(b) by 362 days.

(21) Appl. No.: 12/476,060

(22) Filed: Jun. 1, 2009

(51) Int. Cl.
*G06F 17/00* (2006.01)

(52) U.S. Cl. .................. 715/205; 715/206; 715/207

(58) Field of Classification Search .......... 715/273, 715/205–208, 234
See application file for complete search history.

(56) References Cited

U.S. PATENT DOCUMENTS

| | | | |
|---|---|---|---|
| 2008/0016071 A1* | 1/2008 | Frieden | 707/7 |
| 2008/0086471 A1* | 4/2008 | Ritter et al. | 707/8 |
| 2008/0092044 A1* | 4/2008 | Lewis et al. | 715/713 |
| 2008/0288494 A1* | 11/2008 | Brogger et al. | 707/7 |
| 2009/0063416 A1* | 3/2009 | Faus et al. | 707/3 |
| 2009/0106307 A1* | 4/2009 | Spivack | 707/103 R |
| 2009/0158146 A1* | 6/2009 | Curtis et al. | 715/700 |
| 2009/0182727 A1* | 7/2009 | Majko | 707/5 |
| 2009/0222488 A1* | 9/2009 | Boerries et al. | 707/104.1 |

OTHER PUBLICATIONS

Arrington, Michael. "Tag Your Desktop Stuff With Tag2Find". Dec. 29, 2006. TechCrunch.com. retrieved from http://web.archive.org/web/20070121104124/http://www.techcrunch.com/2006/12/29/tag-your-desktop-stuff-with-tag2find/.*
Unknown. "Calorielookup: Help Page". Mar. 22, 2008. calorielookup.com. pp. 1-12. retrieved from http://web.archive.org/web/20080322234015/http://calorielookup.com/home/help.*
Davis, J., Kant A., Rehfeldt, D., Sullivan, C. "File Tagging Utility (TAG)" Final Report. May 15, 2006. retrieved from http://web.archive.org/web/20060907064242/http://jade.msoe.edu/tag/files/tag_finalreport.pdf.*
Unknown. "Take a Tour of FoundIt: Find those elusive files, always". 2006. pp. 1-19. retrieved from http://web.archive.org/web/20061212080242/http://www.artbrush.net/foundit/tour.htm.*
Gotta, Mike. "Collaborative Thinking: Tagging Beyond Content: Applications & People". Mar. 8, 2006. pp. 1-6. retrieved from http://web.archive.org/web/20060625201406/http://mikeg.typepad.com/perceptions/2006/03/tagging_beyond_.html.*
Webb, Martin. "Helios TextPad 3.2.5". Dec. 3, 2001. pp. 1-5. retrieved from http://web.archive.org/web/20030224211201/http://www.irt.org/software/sw002/.*

(Continued)

*Primary Examiner* — Thu Huynh
(74) *Attorney, Agent, or Firm* — Advantedge Law Group

(57) ABSTRACT

A computer-implemented method for providing workspace navigation with a tag cloud. The computer-implemented method may include identifying a set of launch items within a workspace. The computer-implemented method may also include displaying the tag cloud in a graphical user interface. Each tag in the tag cloud may be associated with one or more launch items from the set of launch items. The computer-implemented method may further include receiving, from the graphical user interface, a selection of a tag from the tag cloud. The computer-implemented method may include using the selected tag to identify a subset of launch items within the set of launch items. The computer-implemented method may also include identifying a request to launch at least one launch item in the subset of launch items and launching the at least one launch item. Various other methods, systems, and computer-readable media are also disclosed.

20 Claims, 7 Drawing Sheets

OTHER PUBLICATIONS

Hsieh, Wen-Tai. Stu,Jay. Chen, Yen-Lin. Chou, Seng-Cho Timothy. "A collaborative desktop tagging system for group knowledge management based on concept space" Expert Systems with Applications. Available online Dec. 25, 2008. vol. 36. Issue 5. pp. 9513-9523. retrieved from http://www.sciencedirect.com/science/article/pii/S0957417408008853).*

Hsieh, J.-L., Chen, C.-H., Lin, I.-W., and Sun, C.-T. "A Web-based Tagging Tool for Organizing Personal Documents on PCs," Proceedings of the CHI 2008. Apr. 10, 2008. pp. 1-7.*

Samer. "Tag your local files with Tag2find Review & Download Link". freewaregenius.com. 2008. pp. 1-9. retrieved from http://web.archive.org/web/20080112153606/http://www.freewaregenius.com/2008/01/09/tag-your-local-files-with-tag2find/.*

Unknown. "Working on the Webtop". Dec. 10, 2008. iapa.com. pp. 1-2. retrieved from http://web.archive.org/web/20081223033738/http://www.iapa.com/index.cfm/travel/blog.article/blog/techguide/art/Working-on-the-Webtop?C=1.*

Schwarz, S., Kiesel, M., van Elst, L. "Adapting the multi-desktop paradigm towards a multi-context interface." In HCP-2008 Proc., Part II, MRC 2008—5th Int. Workshop on Modelling and Reasoning in Context, Jun. 2008. pp. 63-74.*

Unknown. "Download Tag Launcher—A desktop search utility that lets you search files by tags". Apr. 2, 2008. softpedia.com. retrieved from http://web.archive.org/web/20080404025621/http://www.softpedia.com/progScreenshots/Tag-Launcher-Screenshot-96473.html.*

Unknown. "Tag Launcher Screenshots". Apr. 2, 2008. softpedia.com. retrieved from http://web.archive.org/web/20080402005749/http://www.softpedia.com/get/File-managers/Tag-Launcher.shtml.*

S. Foo and D. Hendry. "Desktop Search Engine Visualisation and Evaluation". In Proceedings of the 10th International Conference on Asian Digital Libraries (ICADL'07), Dec. 10-13, 2007, Springer, pp. 372-382.*

Chen, H., Ikeuchi, N., & Jin, Q. "Implementation of Ubiquitous Personal Study Using Web 2.0 Mash-up and OSS Technologies" Proceedings of the 22nd International Conference on Advanced Information Networking and Applications—Workshops. 2008. pp. 1573-1578.*

Unknown. "Upload videos for the world to watch-Soapbox—TechFuels Forum". Mar. 7, 2008. techfuels.com. retrieved from http://web.archive.org/web/20081211060759/http://www.techfuels.com/latest-hardware-news/1252-upload-videos-world-watch-soapbox.html.*

* cited by examiner

METHODS AND SYSTEMS FOR PROVIDING WORKSPACE NAVIGATION WITH A TAG CLOUD

BACKGROUND

Traditional methods for workspace navigation have not changed much over the past decade. A common method of navigating a workspace is to use a hierarchical tree structure to store and display the contents of the workspace. For example, the start menu, introduced in MICROSOFT's WINDOWS 95 operating system and included in MICROSOFT's latest operating system offering, has remained almost unchanged. The start menu provides access to applications and files using a tree structure. As society progresses further into the Digital Age, the amount of data available to users continues to grow at a tremendous rate. Likewise, the number of applications, including open-source software and web-based applications, available to view, create, and edit that data has also grown. Using a tree structure to navigate a workspace with such a large amount of data and applications may be inadequate, or at least inefficient.

Tree structures may be unable to organize the massive number of applications available in a manner that is easily navigated. To accommodate a large number of applications, tree structures may need to increase either the number of items at a particular level of the tree or increase the number of levels used by the tree. As the number of items in the tree increases, the tree may become unusable because of the number of levels and/or the long list of items contained in each level of the tree. The inability for an item to be located in two different places in the tree may be another disadvantage of traditional tree-structure navigation systems. Another inconvenience of using a tree structure is that a typical tree-structure menu may reset its state after a user selects an item. For a tree with many levels, this may be inconvenient. Other disadvantages of tree-structure systems may include the difficulty of changing the location of items in the tree and the inability to place two similar items close together in the tree.

SUMMARY

As will be described in greater detail below, the instant disclosure generally relates to systems and methods for providing workspace navigation with a tag cloud. Some embodiments disclosed herein may enable users to organize and browse applications with a tag cloud. For example, an interface module may identify a set of launch items (e.g., a set of applications and/or documents) within a workspace. The interface module may display a tag cloud in a graphical user interface, with each tag in the tag cloud being associated with one or more launch items from the set of launch items. The interface module may receive, from the graphical user interface, a selection of a tag from the tag cloud and may use the selected tag to identify a subset of launch items (e.g., launch items associated with the selected tag) within the set of launch items. The interface module may also identify a request to launch at least one launch item in the subset of launch items and may launch the launch items as requested.

In some embodiments, the interface module may receive a request to launch every launch item in the subset of launch items. In certain embodiments, the workspace may be a webtop (i.e., a web desktop). In at least one embodiment, the interface module may receive, from the graphical user interface, a request to remove at least one tag from the set of tags. The interface module may remove one or more tags from the set of tags and may update the subset of launch items to reflect the removal of the tags. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
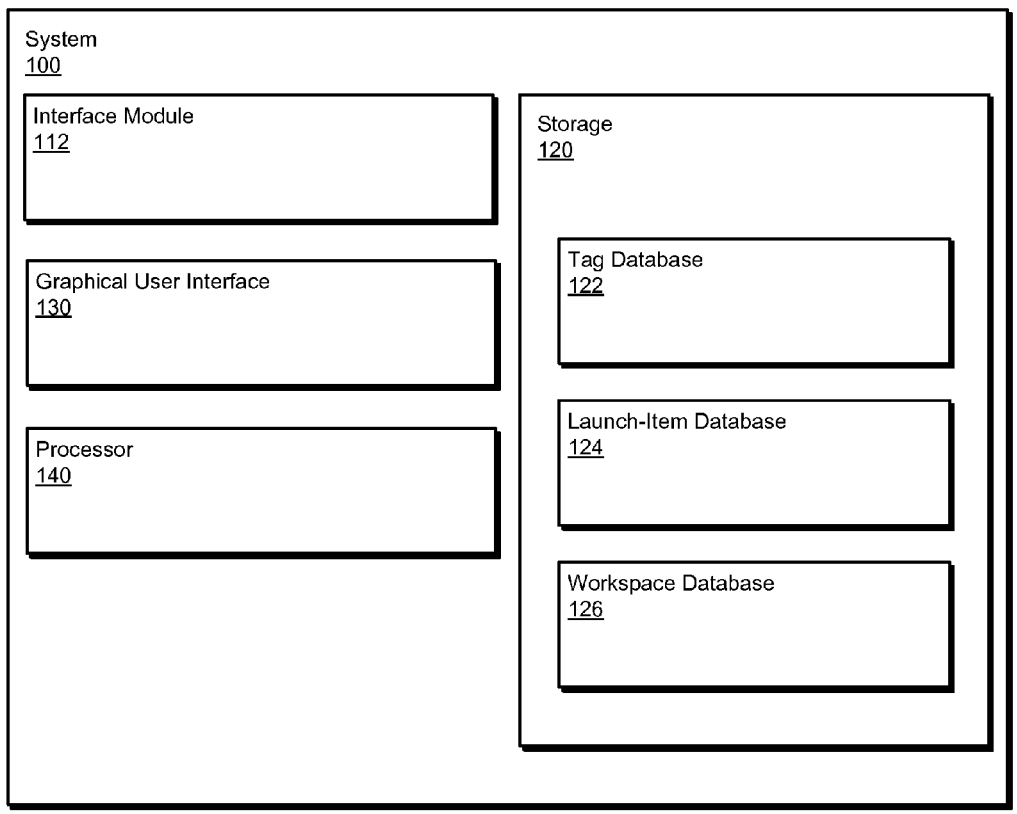
FIG. 1 is a block diagram of an exemplary system for providing workspace navigation with a tag cloud.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the instant disclosure provide methods and systems for navigating a workspace with a tag cloud. In some embodiments, an interface module may identify a set of launch items within a workspace. The interface module may display the tag cloud in a graphical user interface, and each tag in the tag cloud may be associated with one or more launch items from the set of launch items. The interface module may receive, from the graphical user interface, a selection of a tag from the tag cloud and may use the selected tag to identify a subset of launch items (i.e., launch items associated with the selected tag) within the set of launch items. In some embodiments, successive tag selection from a user may narrow the subset of launch items. The interface module may also identify a request to launch at least one launch item in the subset of launch items and may launch the at least one launch item.

As an example of using a tag cloud to navigate a workspace, a user may tag several web development applications with a "web dev" tag. The interface module may display the "web dev" tag in a tag cloud. The user may click on the "web dev" tag, and the interface module may receive the selection.

In response to the selection, the interface module may display one or more of the tagged web development applications and/or may launch one or more of the tagged web development applications. As illustrated in this example and further explained herein, systems and methods disclosed herein may allow similar launch items to be located and launched together. Embodiments of the instant disclosure may also enable effective management of large numbers (and small numbers) of applications, may provide for efficient navigation of a work space, and may also provide various other features and advantages.

Figure 2:
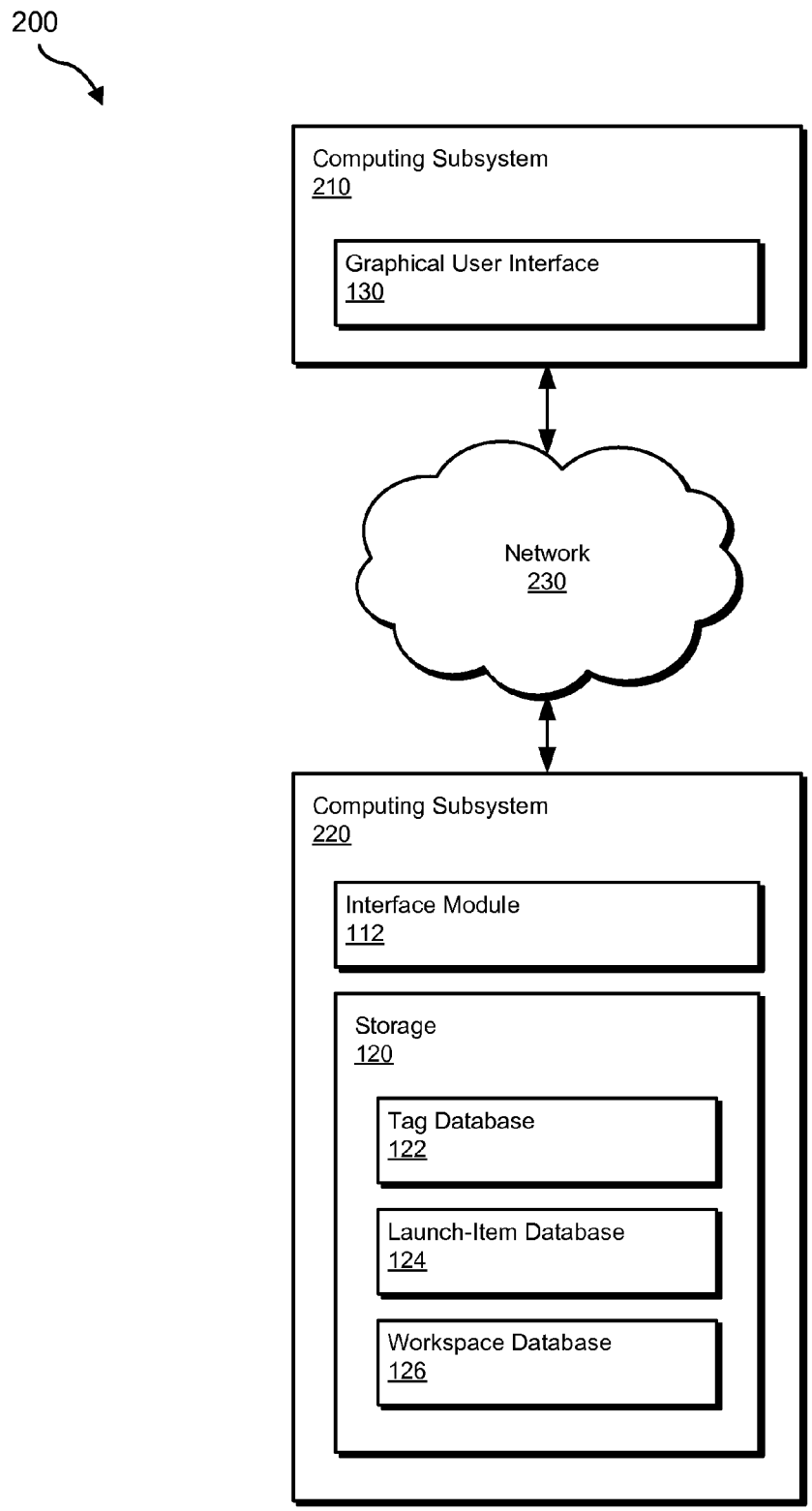
FIG. 2 is a block diagram of another exemplary system for providing workspace navigation with a tag cloud.
Figure 3:
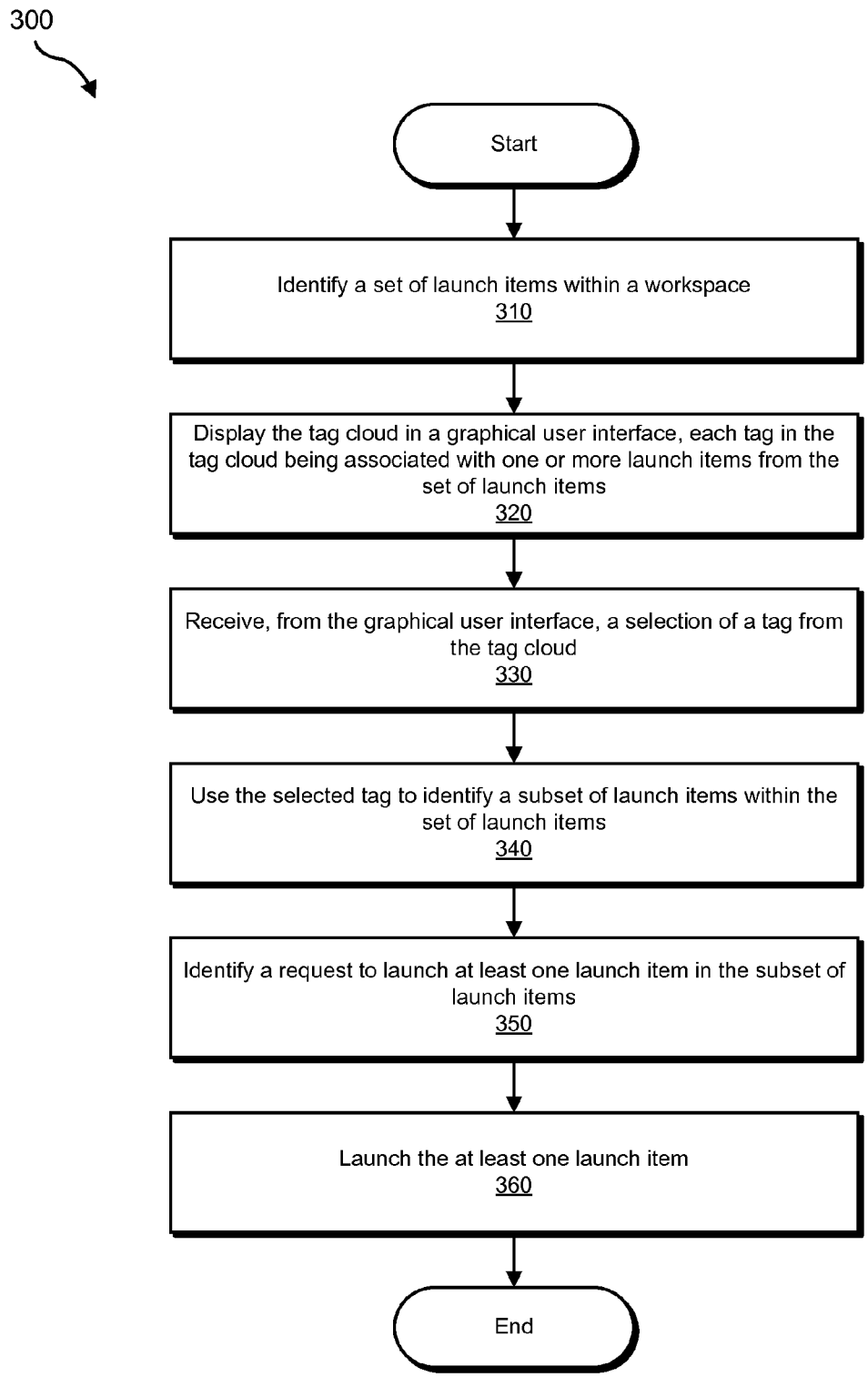
FIG. 3 is a flow diagram of an exemplary method for providing workspace navigation with a tag cloud.
Figure 4:
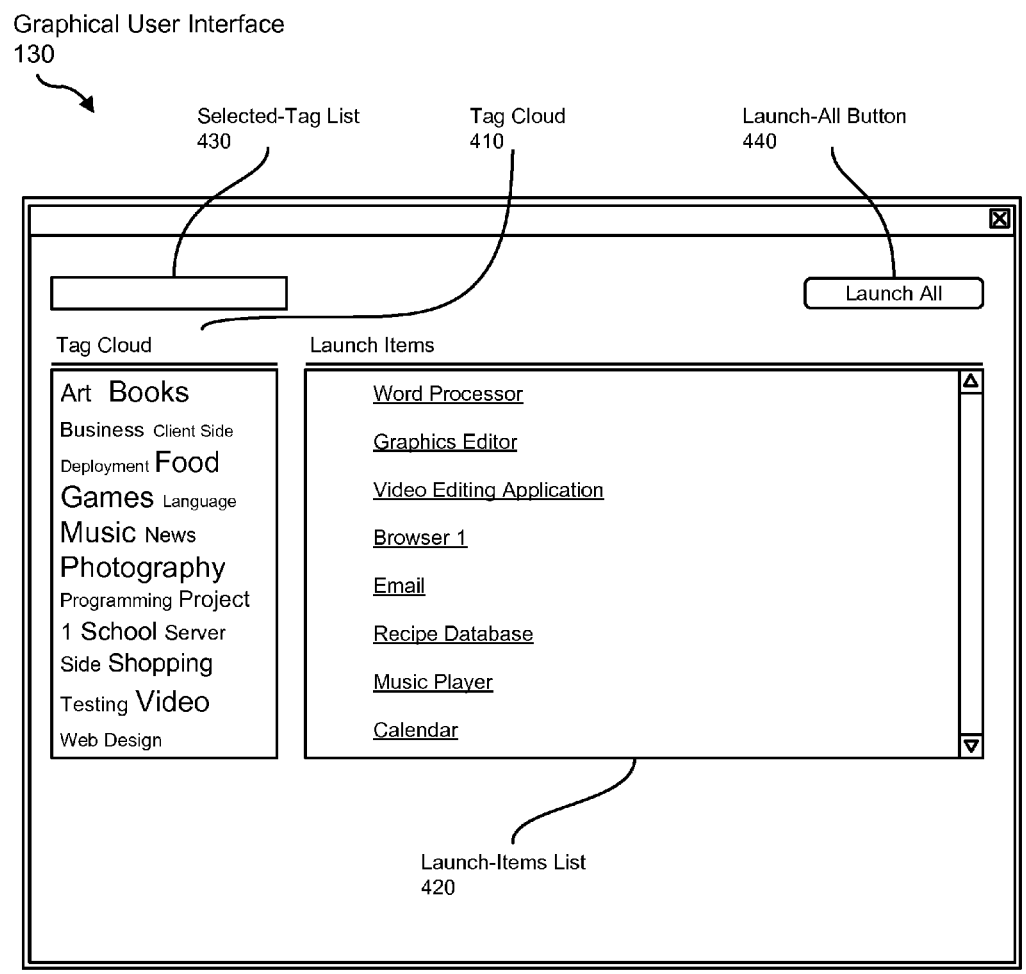
FIG. 4 is a diagram of an exemplary graphical interface providing workspace navigation with a tag cloud.
Figure 5:
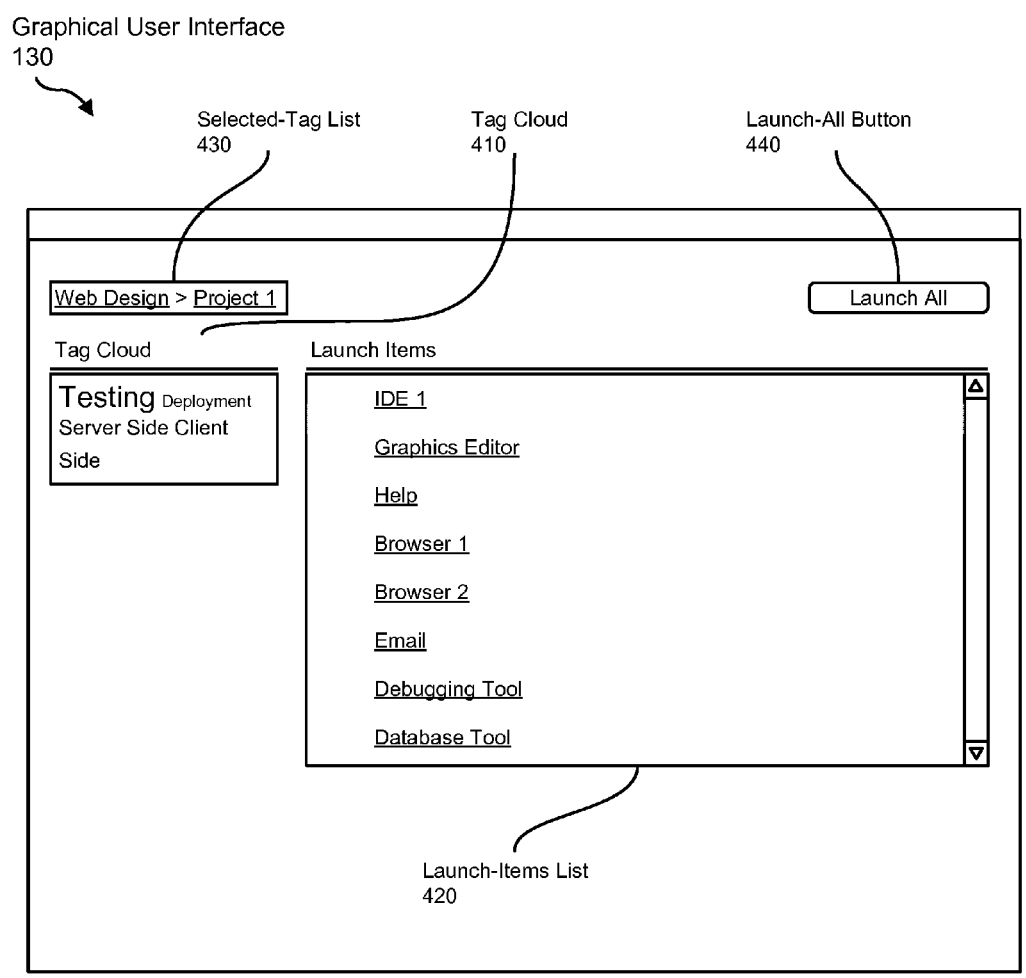
FIG. 5 is a diagram of another exemplary graphical interface providing workspace navigation with a tag cloud.
Figure 6:
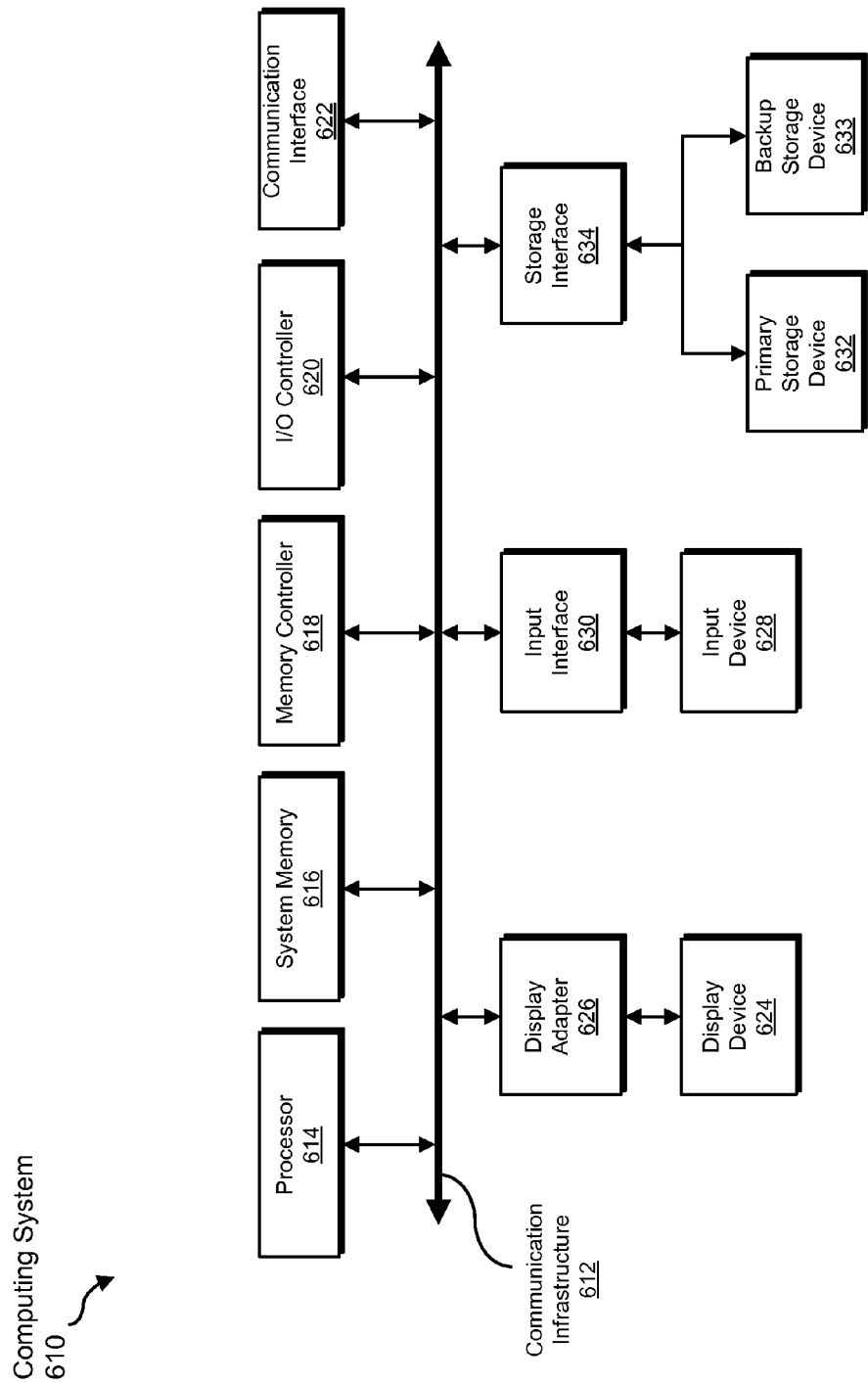
FIG. 6 is a block diagram of an exemplary computing system capable of implementing one or more of the embodiments described and/or illustrated herein.
Figure 7:
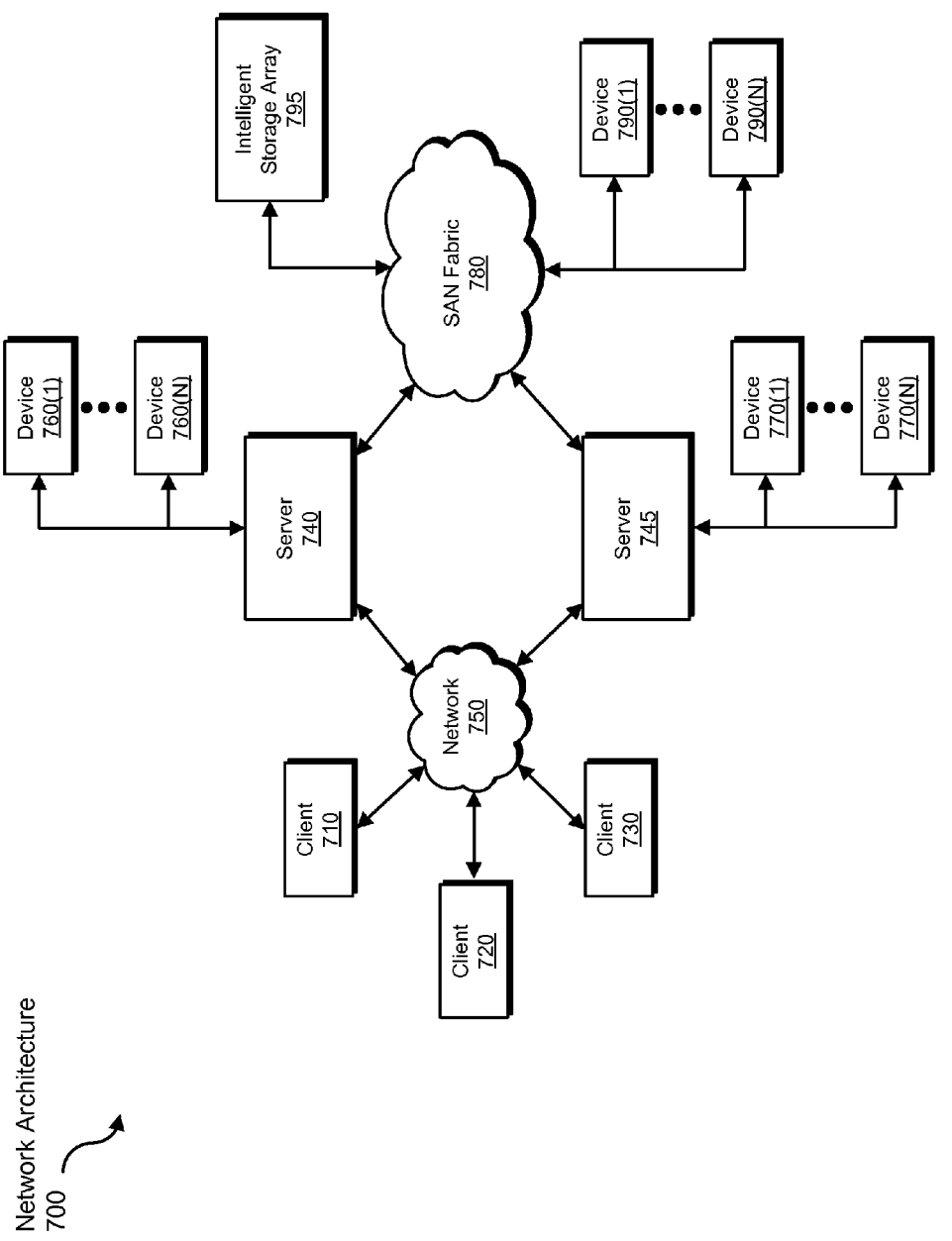
FIG. 7 is a block diagram of an exemplary computing network capable of implementing one or more of the embodiments described and/or illustrated herein.

FIGS. 1 and 2 show exemplary systems for providing workspace navigation with a tag cloud. FIG. 3 shows an exemplary method for accomplishing the same. FIGS. 4 and 5 illustrate an exemplary graphical user interface, and FIGS. 6 and 7 illustrate an exemplary network and computing system for implementing embodiments of the instant disclosure.

FIG. 1 illustrates an exemplary system 100 for providing workspace navigation with a tag cloud. System 100 may include an interface module 112, storage 120, a graphical user interface 130, and a processor 140. Interface module 112 may be programmed to identify a set of launch items within a workspace. Interface module 112 may also be programmed to display a tag cloud in graphical user interface 130 and receive, from graphical user interface 130, a selection of a tag from the tag cloud. Interface module 112 may be programmed to use the selected tag to identify a subset of launch items within the set of launch items, identify a request to launch at least one launch item in the subset of launch items, and launch the at least one launch item.

In certain embodiments, interface module 112 may represent one or more software applications or programs that, when executed by a computing system, may cause the computing system to perform one or more steps disclosed herein. For example, as will be described in greater detail below, interface module 112 may represent one or more software modules configured to run on one or more computing devices, such as computing system 610 in FIG. 6 and/or portions of exemplary network architecture 700 in FIG. 7. Interface module 112 may also represent all or portions of one or more special-purpose computers configured to perform one or more of the tasks associated with steps disclosed herein.

As previously noted, system 100 may include storage 120. Storage 120 may represent any storage hardware and/or software, such as storage device 632 and/or 633 in FIG. 6. Storage 120 may generally represent any type or form of storage device or medium capable of storing data. Storage 120 may include a tag database 122, a launch-item database 124, and/or a workspace database 126. Tag database 122 may store a plurality of tags. Tag database 122 may also store any other information associated with using a tag cloud to navigate a workspace, including information associating each tag with one or more launch items and/or one or more workspaces. Launch-item database 124 may store a plurality of launch items and/or a plurality of references (e.g., links, shortcuts, and/or other identification information) to launch items. Launch-item database 124 may also store any other information associated with using a tag cloud to navigate a workspace, including information associating each launch item with one or more tags and/or one or more workspaces. Workspace database 126 may store a plurality of workspaces. Workspace database 126 may also store any other information associated with using a tag cloud to navigate a workspace, including information associating each workspace with one or more launch items and/or one or more tags.

In certain embodiments, the elements of system 100 may be located on the same physical computing device. In other embodiments, as shown in FIG. 2, the elements of system 100 may be located on physically separate computing devices in any suitable configuration.

FIG. 2 is a block diagram of a system 200 that illustrates an exemplary configuration of components of system 100. System 200 may include a computing subsystem 210, a computing subsystem 220, and a network 230. Computing subsystems 210 and/or 220 may generally represent any type or form of computing device capable of reading computer-executable instructions. Examples of computing subsystems 210 and/or 220 may include, without limitation, laptops, desktops, servers, cellular phones, personal digital assistants ("PDAs"), multimedia players, embedded systems, combinations of one or more of the same, exemplary computing system 610 in FIG. 6, or any other suitable computing device.

As shown, computing subsystem 210 may include graphical user interface 130, and computing subsystem 220 may include interface module 112 and storage 120. In some embodiments, computing subsystem 210 may be a user's computing device, and computing subsystem 220 may include a workspace server and may provide a webtop or other workspace environment. In certain embodiments, computing subsystems 210 and 220 may reside on a single computing device and may communicate using any suitable protocol. For example, computing subsystems 210 and 220 may allow a user to navigate a desktop, a directory, a project workspace, or any other workspace.

Computing subsystem 210 and computing subsystem 220 may communicate over network 230. Network 230 generally represents any medium or architecture capable of facilitating communication or data transfer. Examples of network 230 include, without limitation, an intranet, a wide area network ("WAN"), a local area network ("LAN"), a personal area network ("PAN"), the Internet, power line communications ("PLC"), a cellular network (e.g., a GSM network), exemplary network architecture 700 in FIG. 7, or the like. Network 230 may facilitate communication or data transfer using wireless and/or wired connections.

FIG. 3 shows an exemplary method 300 for providing workspace navigation with a tag cloud. The steps shown in FIG. 3 may be performed by any suitable computer executable code and/or computing system. In some embodiments, the steps shown in FIG. 3 may be performed by one or more of interface module 112 and/or graphical user interface 130. For example, at step 310 interface module 112 may identify a set of launch items within a workspace. Interface module 112 may identify the set of launch items within the workspace in a variety of contexts. For example, interface module 112 may query workspace database 126 for launch items associated with the workspace as part of a process of displaying a tag cloud. In some embodiments, interface module 112 may identify the set of launch items when a user logs into or otherwise activates the workspace. Additionally or alternatively, interface module 112 may identify each item in the set of launch items as a user tags each item with a tag.

Graphical user interface 130 (or any other suitable interface or software program) may enable a user to tag items and/or otherwise manage tags. For example, when graphical user interface 130 displays a launch item, graphical user interface 130 may also display each tag associated with the launch item. In such embodiments, the user may remove one or more tags associated with launch item and/or tag the launch item with one or more additional tags. Graphical user interface 130 may also allow a user to edit a tag associated with a launch item.

A user may also manage tags associated with launch items in a variety of other ways. In some embodiments, when a user right-clicks a launch item or a shortcut to a launch item, the user may be presented with an option to add a tag to the launch item. Additionally or alternatively, a user may interact with a tag management interface (e.g., through a graphical user interface) to add, remove, and/or edit tags associated with launch items.

In certain embodiments, a software application, such as interface module 112, may fully or partially automate the process of tagging launch items. In such embodiments, interface module 112 may determine that a user has accessed the same two launch items together multiple times. For example, the user may typically open a browser window to an online thesaurus when the user is running a word processing program. In this example, the software application may determine that the online thesaurus and the word processing program should be tagged with the same tag. The software application may automatically assign a tag to both launch items and/or prompt the user to tag the launch items with the same tag.

As used herein, the term "launch item" may refer to an application, a document, a reference to an application or document, and/or any other object or shortcut to an object that may be accessible from a workspace. For example, a launch item may include an application installed locally, a local document, a web-based application, or a remote document. As used herein, the term "application" may refer to any executable program capable of executing on a computing system. As used herein, the term "document" may refer to a variety of data objects, such as a digital file, a digital picture, a digital music file, a digital video file, a web page, a module, a window, a user interface, an internet bookmark, a word processing file, a computing resource, and/or any other suitable digital information.

A workspace may include any interface that allows a user to navigate and/or access launch items. For example, a workspace may include a desktop, a webtop (i.e. a web desktop), a directory, a file, and/or any other suitable workspace. As used herein, the term "webtop" may refer to a desktop environment embedded in a web browser or other client application. For example, a webtop may integrate web applications, web services, client-server applications, application servers, and/or other applications in a remote desktop environment. A webtop may also be referred to as a virtual desktop.

Returning to FIG. 3, at step 320, interface module 112 may display a tag cloud in graphical user interface 130, and each tag in the tag cloud may be associated with one or more launch items from the set of launch items. Interface module 112 may display the tag cloud in any suitable manner. For example, interface module 112 may query tag database 122 for a list of tags to be displayed in the tag cloud. The list of tags may include each tag that has been associated with the launch items contained in the set of launch items. Interface module 112 may then send the list of tags to graphical user interface 130 to be displayed in the tag cloud. An example of interface module 112 displaying a tag cloud in graphical user interface 130 will be described in more detail in the description of FIGS. 4 and 5.

As used herein, the term "tag cloud" may refer to any graphical depiction of a set of tags. Each tag displayed in a tag cloud may be represented as a hyperlink that, when selected, causes representations of a set of launch items associated with the tag to be displayed. In some instances, tags may be listed alphabetically within the tag cloud, and the relative importance of each tag may be shown in a variety of ways. Tags may also be displayed in a tag cloud in any other suitable manner.

In various embodiments, interface module 112 may determine how prominently to display one or more tags in the tag cloud. Interface module 112 may determine how prominently to display a tag based on a number of launch items associated with the tag, a number indicating how frequently the tag is selected, and/or a number indicating how recently the tag was selected. For example, a first tag may be displayed more prominently than a second tag if the number of launch items associated with the first tag is greater than the number of launch items associated with the second tag, if the first tag is selected more frequently than the second tag, and/or if the first tag was selected more recently than the second tag. In some embodiments, interface module 112 may determine how prominently to display the first tag by determining a size of the first tag, a placement of the first tag within the tag cloud, and/or a color of the first tag. For example, the first tag may be displayed more prominently than the second tag by displaying the first tag with a larger font size that the second tag, by displaying the first tag higher in the tag cloud than the second tag, and/or by using a color with more saturation and/or a darker hue to display the first tag.

At step 330, interface module 112 may receive, from graphical user interface 130, a selection of a tag from the tag cloud. In some embodiments, a user may select (e.g., click) a tag displayed in graphical user interface 130. Graphical user interface 130 may then send the user's selection to interface module 112.

A user may select multiple tags when using a tag cloud to navigate a workspace. In such embodiments, interface module 112 may add each tag selected by the user to a set of selected tags, and interface module 112 may use the set of selected tags to filter the set of launch items displayed to the user. For example, if a user first selects a "home video" tag, interface module 112 may only display launch items tagged with the "home video" tag. If the user then selects a "current projects" tag, interface module 112 may only display launch items tagged with both the "home video" tag and the "current projects" tag, which may be a subset of the launch items tagged with the "home video" tag.

As used herein, the term "tag" may refer to any human-readable text (e.g., words, phrases, and/or characters that may be easily read or understood by a human). For example, a tag may describe a property or feature of the content with which the tag is associated. The term "tag" may refer to any non-hierarchical keyword, term, or other meta-data that may be assigned to a launch item. In some examples, tags may be created and associated with launch items by launch-item owners, launch-item managers, users who access the launch item, and/or any other user or software program.

At step 340, interface module 112 may use the selected tag (or tags) to identify a subset of launch items within the set of launch items. In other words, interface module 112 may identify each launch item tagged (i.e., associated with) the selected tag. In some embodiments, interface module 112 may query tag database 122 for a list of launch items associated with the selected tag. If the user selects multiple tags, interface module 112 may identify a list of launch items associated with each selected tag and may identify a subset of launch items by identifying the launch items included on each list (i.e., interface module 112 may determine an intersection of each list of launch items associated with a selected tags). In other words, each time a user selects a tag, interface module 112 may add the selected tag to a set of selected tags, and interface module 112 may use the set of selected tags to identify the subset of launch items by identifying each launch item in the set of launch items that is associated with each tag in the set of tags. For example, if the set of tags contains the tags "music" and "books," then the subset of launch items would contain only launch items associated with both the "music" and "books" tags. In certain embodiments, interface module 112 may display the subset of launch items in graphical user interface 130.

As noted, after a user selects a tag, interface module 112 may display representations of one or more launch items associated with the tag in graphical user interface 130. A representation of a launch item may include any information identifying a launch item, such as a shortcut, a hyperlink, a name of the launch item, and/or an icon identifying the launch item. If a user selects multiple tags, interface module 112 may reduce the representations of launch items displayed to only those launch items associated with each tag selected by the user.

At step 350, interface module 112 may identify a request to launch at least one launch item in the subset of launch items. Interface module 112 may identify the launch request in any suitable manner. For example, graphical user interface 130 may display a representation of each launch item in the subset of launch items, and a user may select one or more launch items that the user wants to launch. Graphical user interface 130 may send the selection of the one or more launch items to be launched to interface module 112.

At step 360, interface module 112 may launch the at least one launch item. For example, interface module 112 may execute (e.g., run) the launch item, open the launch item, allow access to the launch item, and/or send the launch item to graphical user interface 130 to be displayed.

A user may trigger the launch of a launch item in a variety of different manners. In some embodiments, representations of launch items displayed in graphical user interface 130 may be shortcuts (or may be otherwise linked) to respective launch items. In such embodiments, the user may launch a launch item by selecting (e.g., clicking on) the representation of the launch item. Additionally or alternatively, graphical user interface 130 may display a "launch all" button which, when selected by a user, may launch each launch item identified in graphical user interface 130. In certain embodiments, one or more launch items associated with a tag may automatically launch when a user selects the tag.

As an example of how launch items may be launched, a user may tag each of a presentation editor, an image editor, and a web page with a "school presentation" tag, and the "school presentation" tag may be displayed in graphical user interface 130. At a later point in time, the user may select the "school presentation" tag in graphical user interface 130, causing interface module 112 to display representations of the presentation editor, the image editor, and the web page. The user may then select a "launch all" button, and in response, interface module 112 may open the presentation editor, the image editor, and the web page.

In some embodiments, at any point during the process illustrated in FIG. 3, a user may reset graphical user interface 130 to a base state. For example, if a user selects several tags and then decides to look for launch items associated with different tags, the user may select a reset button (or provide any other input that indicates a desire to reset navigation). Then, interface module 112 may reset navigation by clearing the set of selected tags. Additionally or alternatively, a user may be able to unselect a previously selected tag, and interface module 112 may respond by updating the subset of launch items accordingly (e.g., updating the subset of launch items to include each launch item tagged with each tag in the updated set of selected tags).

FIGS. 4 and 5 illustrate how graphical user interface 130 may be used to navigate a webtop. The following discussion provides an example of how a user may interact with a tag cloud displayed in graphical user interface 130 to work on a web design project. FIG. 4 shows what graphical user interface 130 may look like at first point in time. FIG. 5 shows graphical user interface 130 as it may appear at a second point in time, after the user has selected tags displayed in graphical user interface 130.

As shown, graphical user interface 130 may include a tag cloud 410, a launch-items list 420, a selected-tag list 430, and a launch-all button 440. In certain embodiments, tag cloud 410 may display all tags associated with a launch item. When a user selects a tag, the tag may be added to selected-tag list 430, and launch-items list 420 may display a representation each launch item associated with the selected tag (or tags). In other words, selected-tag list 430 may display each tag selected by the user, and launch-items list 420 may display a representation of each launch item tagged with each tag in selected-tag list 430.

In one example, computing subsystem 210 may be a user's computing device, and computing subsystem 220 may host numerous webtops. When a user attempts to log into a webtop, interface module 112 may use the user's authentication information to identify the webtop from workspace database 126 associated with the user. Interface module 112 may also query launch-item database 124 to identify a set of launch items associated with the user's webtop and may query tab database 122 to identify a list of all tags associated with the launch items.

Interface module 112 may cause graphical user interface 130 to be displayed to the user as part of displaying the webtop to the user. In some embodiments, graphical user interface 130 may be automatically displayed when the user logs into the webtop. Additionally or alternatively, graphical user interface 130 may be displayed when the user clicks on a navigation button, a start button, and/or when the user provides any other input indicating that the user wants to view graphical user interface 130.

When graphical user interface 130 is displayed, interface module 112 may send representations of the set of launch items and/or the list of tags to graphical user interface 130. The list of tags may be displayed in tag cloud 410 and the representations of the set of launch items may be displayed in launch-items list 420.

As shown in FIG. 4, tag cloud 410 may display a list of tags that includes the tags "Art," "Books," and "Web Design," among others. In some embodiments, each representation of a launch item displayed in launch-items list 420 may include a hyperlink that, when clicked, causes the selected launch item to be launched. At any time the user may select a tag in tag cloud 410, launch a launch item in launch-items list 420, and/or launch every launch item in launch-items list 420.

The user may begin navigating the webtop by clicking (i.e., selecting) the "Web Design" tag displayed in tag cloud 410, and interface module 112 may receive the selection from graphical user interface 130. Interface module 112 may add "Web Design" to a set of selected tags (e.g., the set of tags displayed in selected-tag list 430). At this moment, the set of tags may only include a single tag: "Web Design."

Interface module 112 may identify each launch item associated with the "Web Design" tag, thereby identifying a subset of launch items from the set of launch items. Interface module 112 may instruct graphical user interface 130 to update launch-items list 420 to display only representations of the subset of launch items. In some embodiments, interface module 112 may also update tag cloud 410 so that tag cloud 410 contains only tags that are associated with the launch items contained in the subset of launch-items displayed in launch-items list 420, one such tag being "Project 1." In other embodiments, interface module 112 may not change tag cloud 410 after a tag is selected.

The user may continue navigating the webtop by selecting the "Project 1" tag displayed in tag cloud 410. Interface module 112 may add "Project 1" to the set of tags displayed in selected-tag list 430 and may update the subset of launch items to reflect the addition of "Project 1" to selected-tag list 430. Interface module 112 may then send representations of the subset of launch items to graphical user interface 130, and graphical user interface 130 may refresh launch-items list 420 to display only representations of launch items in the updated subset of launch items (i.e., the launch items associated with both the "Project 1" tag and the "Web Design" tag). Graphical user interface 130 may also update tag cloud 410 to only display tags associated with the launch items in the updated subset of launch items. The user may now see graphical user interface 130 as it is shown in FIG. 5. In FIG. 5, selected-tag list 430 displays both the "Web Design" and "Project 1" tags, launch-items list 420 contains only representations of launch items that are associated with both the "Web Design" and the "Project 1" tags, and tag cloud 410 contains only tags associated with the launch items displayed in launch-items list 420.

The user may then request to launch the graphics editor displayed in launch-item list 420 by selecting the graphics editor. In some embodiments, graphical user interface 130 may launch the graphics editor. In other embodiments, graphical user interface 130 may send the request to launch the graphics editor to interface module 112, and interface module 112 may launch the graphics editor. In at least one embodiment, the user may use launch-all button 440 to launch every launch item in launch-items list 420. Thus, a user may be able to easily navigate to, view, and launch programs or other launch items associated with a particular tag or tags.

In some embodiments, the user may use selected-tag list 430 to remove, by clicking on or otherwise selecting, previously selected tags. In response, interface module 112 may update the subset of launch-items displayed in launch-items list 420 and/or the tags displayed in tag cloud 410.

One or more of the steps disclosed herein may transform data and/or one or more computing devices. For example, providing tag-based navigation for a workspace may transform a workspace with a traditional navigation system into a workspace with a more efficient tag-based navigation system.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, displaying, receiving, using, launching, adding, removing, updating, and determining steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, displaying, receiving, using, launching, adding, removing, updating, and determining.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, displaying, receiving, using, launching, adding, removing, updating, and determining steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, displaying, receiving, using, launching, adding, removing, updating, and determining steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, displaying, receiving, using, launching, adding, removing, updating, and determining steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, displaying, receiving, using, launching, adding, removing, updating, and determining steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, displaying, receiving, using, launching, adding, removing, updating, and determining steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of the exemplary methods described and/or illustrated herein. For example a computing system (e.g., computing system 610 and/or one or more components of network architecture 700) may perform a computer-implemented method for providing workspace navigation with a tag cloud.

In some embodiments, the computing system may identify a set of launch items within a workspace. The computing system may display the tag cloud in a graphical user interface, and each tag in the tag cloud may be associated with one or more launch items from the set of launch items. The computing system may receive, from the graphical user interface, a selection of a tag from the tag cloud. The computing system may then use the selected tag to identify a subset of launch items within the set of launch items. The computing system may identify a request to launch at least one launch item in the subset of launch items. The computing system may further launch the at least one launch item. In certain embodiments, the computing system may identify the request to launch at least one launch item by identifying a request to launch every launch item in the subset of launch items. In some embodiments, the selection of the tag may comprise the request to launch the at least one launch item.

In various embodiments, the computing system may add the selected tag to a set of tags. In certain embodiments, the computing system may use the selected tag to identify the subset of launch items by using the set of tags to identify the subset of launch items. In some embodiments, the computing system may use the set of tags to identify the subset of launch items by identifying each launch item in the set of launch items that is associated with each tag in the set of tags. In at least one embodiment, the computing system may display the set of tags in the graphical user interface. The computing system may receive, from the graphical user interface, a request to remove at least one tag from the set of tags. The computing system may then remove the at least one tag from the set of tags. The computing system may also update the subset of launch items to reflect the removal of the at least one tag. In certain embodiments, the computing system may receive the request to remove the at least one tag from the set of tags by receiving a request to remove all tags from the set of tags.

In some embodiments, the workspace may include a webtop. In certain embodiments, the set of launch items may include at least one application and/or at least one document. In some embodiments, the computing system may display the tag cloud in the graphical user interface by identifying a first tag to display in the tag cloud, determining how prominently to display the first tag, and displaying the first tag according to the determination. Determining how prominently to display the first tag may be based on a number of launch items associated with the first tag, a number indicating how frequently the first tag is selected, and/or a number indicating how recently the first tag was selected.

In at least one embodiment, the computing system may determine how prominently to display the first tag by determining a size of the first tag, a placement of the first tag within the tag cloud, and/or a color of the first tag. In some embodiments, the computing system may display the subset of launch items.

In certain embodiments, the computing system may include an interface module. The interface module may identify a set of launch items within a workspace. The interface module may display the tag cloud in a graphical user interface, with each tag in the tag cloud being associated with one or more launch items. The interface module may receive, from the graphical user interface, a selection of a tag from the tag cloud. The interface module may then use the selected tag to identify a subset of launch items within the set of launch items. The interface module may identify a request to launch at least one launch item in the subset of launch items. The interface module may also launch the at least one launch item. The computing system may also include one or more processors configured to execute the interface module.

In various embodiments the interface module may identify the request to launch at least one launch item by identifying a request to launch every launch item in the subset of launch items. In some embodiments the selection of the tag may comprise the request to launch the at least one launch item. In certain embodiments the interface module may add the selected tag to a set of tags. In at least one embodiment, using the selected tag to identify the subset of launch items may comprise using the set of tags to identify the subset of launch items. In some embodiments, the interface module may use the set of tags to identify the subset of launch items by identifying each launch item in the set of launch items that is associated with each tag in the set of tags.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for providing workspace navigation with a tag cloud, at least a portion of the method being performed by a computing system comprising at least one processor, the method comprising:
   receiving a request to associate a tag with a first launch item, the first launch item comprising a first executable program;
   in response to the request to associate the tag with the first launch item, associating the tag with the first launch item;
   receiving a request to associate the tag with a second launch item, the second launch item comprising a second executable program;
   in response to receiving the request to associate the tag with the second launch item, associating the tag with the second launch item, the first and second launch items comprising a subset of launch items;
   identifying a set of launch items within a workspace;
   displaying the tag cloud in a graphical user interface, each individual tag in the tag cloud being associated with one or more launch items from the set of launch items;
   receiving, from the graphical user interface, a selection of the tag from the tag cloud;
   using the selected tag to identify the subset of launch items within the set of launch items;
   identifying a request to launch all items in the subset of launch items; and
   in response to receiving the request to launch all items, launching all the items in the subset of launch items, wherein the launching all the items comprises running the first and second executable programs.

2. The computer-implemented method of claim 1, wherein identifying the request to launch all of the items in the subset of launch items comprises identifying a request to launch a set of items associated with a user-defined project.

3. The computer-implemented method of claim 1, wherein the selection of the tag comprises the request to launch all of the items in the subset of launch items.

4. The computer-implemented method of claim 1, further comprising adding the selected tag to a set of selected tags.

5. The computer-implemented method of claim 4, wherein using the selected tag to identify the subset of launch items comprises using the set of selected tags to identify the subset of launch items.

6. The computer-implemented method of claim 5, wherein using the set of selected tags to identify the subset of launch items comprises identifying each launch item in the set of launch items that is associated with each tag in the set of tags.

7. The computer-implemented method of claim 4, further comprising:
   displaying the set of selected tags in the graphical user interface;
   receiving, from the graphical user interface, a request to remove at least one tag from the set of selected tags;
   removing the at least one tag from the set of selected tags;
   updating the subset of launch items to reflect the removal of the at least one tag.

8. The computer-implemented method of claim 7, wherein receiving the request to remove the at least one tag from the set of selected tags comprises receiving a request to remove all tags from the set of selected tags.

9. The computer-implemented method of claim 1, wherein the workspace comprises a webtop.

10. The computer-implemented method of claim 1, wherein associating the tags with the first and second launch items comprises associating the first and second executable programs with a user-defined project.

11. The computer-implemented method of claim 1, wherein displaying the tag cloud in the graphical user interface comprises:
   identifying a first tag to display in the tag cloud;
   determining how prominently to display the first tag based on at least one of:
      a number of launch items associated with the first tag;
      a number indicating how frequently the first tag is selected;
      a number indicating how recently the first tag was selected;
   displaying the first tag according to the determination.

12. The computer-implemented method of claim 11, wherein determining how prominently to display the first tag comprises determining at least one of:
   how large to display the first tag;
   where to place the first tag within the tag cloud;
   a color to use for displaying the first tag.

13. The computer-implemented method of claim 1, further comprising displaying the subset of launch items.

14. A system for providing workspace navigation with a tag cloud, the system comprising:
   a graphical user interface configured to display the tag cloud, each individual tag in the tag cloud being associated with one or more launch items from a set of launch items within a workspace;
   an interface module in communication with the graphical user interface and programmed to:
      receive a request to associate a tag with a first launch item, the first launch item comprising a first executable program;
      in response to the request to associate the tag with the first launch item, associate the tag with the first launch item;
      receive a request to associate the tag with a second launch item, the second launch item comprising a second executable program;
      in response to receiving the request to associate the tag with the second launch item, associate the tag with the second launch item, the first and second launch items comprising a subset of launch items;
      identify the set of launch items;
      receive, from the graphical user interface, a selection of the tag from the tag cloud;
      use the selected tag to identify the subset of launch items within the set of launch items;
      identify a request to launch all items in the subset of launch items;
      in response to receiving the request to launch all items, launch all the items in the subset of launch items, wherein the launch all the items comprises running the first and second executable programs; and
   one or more processors configured to execute the interface module and cause the graphical user interface to be displayed on a display device.

15. The system of claim 14, wherein the interface module is programmed to identify the request to launch all of the items in the subset of launch items by identifying a request to launch a set of items associated with a user-defined project.

16. The system of claim 14, wherein the selection of the tag comprises the request to launch all of the items in the subset of launch items.

17. The system of claim 14, wherein the interface module is further programmed to add the selected tag to a set of selected tags.

18. The system of claim 17, wherein using the selected tag to identify the subset of launch items comprises using the set of selected tags to identify the subset of launch items.

19. The system of claim 18, wherein the interface module is programmed to use the set of selected tags to identify the subset of launch items by identifying each launch item in the set of launch items that is associated with each tag in the set of selected tags.

20. A computer-readable-storage medium comprising one or more computer-executable instructions that, when executed by a computing device, cause the computing device to:
   receive a request to associate a tag with a first launch item, the first launch item comprising a first executable program;
   in response to the request to associate the tag with the first launch item, associate the tag with the first launch item;
   receive a request to associate the tag with a second launch item, the second launch item comprising a second executable program;
   in response to receiving the request to associate the tag with the second launch item, associate the tag with the second launch item, the first and second launch items comprising a subset of launch items;
   identify a set of launch items within a workspace;
   display a tag cloud in a graphical user interface, each individual tag in the tag cloud being associated with one or more launch items from the set of launch items;
   receive, from the graphical user interface, a selection of the tag from the tag cloud;
   use the selected tag to identify the subset of launch items within the set of launch items;
   identify a request to launch all of the items in the subset of launch items; and
   in response to receiving the request to launch all items, launch all the items in the subset of launch items, wherein the launch all the items comprises running the first and second executable programs.

* * * * *